United States Patent
High et al.

(10) Patent No.: US 10,494,180 B2
(45) Date of Patent: Dec. 3, 2019

(54) SYSTEMS AND METHODS FOR DISTRIBUTED AUTONOMOUS ROBOT INTERFACING USING LIVE IMAGE FEEDS

(71) Applicant: Walmart Apollo, LLC, Bentonville, AR (US)

(72) Inventors: Donald R. High, Noel, MO (US); David Winkle, Bella Vista, AR (US); Brian Gerard McHale, Oldham (GB); Todd Davenport Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/217,865

(22) Filed: Dec. 12, 2018

(65) Prior Publication Data
US 2019/0119041 A1    Apr. 25, 2019

Related U.S. Application Data

(63) Continuation of application No. 15/880,713, filed on Jan. 26, 2018, now Pat. No. 10,189,642.
(Continued)

(51) Int. Cl.
*G06F 7/00*    (2006.01)
*B65G 1/137*    (2006.01)
(Continued)

(52) U.S. Cl.
CPC .............. *B65G 1/1378* (2013.01); *B25J 9/06* (2013.01); *B25J 19/023* (2013.01);
(Continued)

(58) Field of Classification Search
None
See application file for complete search history.

(56) References Cited

U.S. PATENT DOCUMENTS 6,535,793 B2    3/2003 Allard
6,584,375 B2 *  6/2003 Bancroft ................. A47F 10/00
                                                    235/383
(Continued)

FOREIGN PATENT DOCUMENTS

WO    2016014917 A1    1/2016
WO    2016130849 A1    8/2016

OTHER PUBLICATIONS

Lowe's Introduces Robot Shopping Assistant, http://www.botmag.com/lowesintroducesrobotshoppingassistant/, last viewed Sep. 9, 2016.
(Continued)

*Primary Examiner* — Yolanda R Cumbess
(74) *Attorney, Agent, or Firm* — McCarter & English, LLP; David R. Burns

(57) ABSTRACT

Described in detail herein is an autonomous fulfillment system. The system includes the first computing system with an interactive display. The first computing system can transmit a request for physical objects from a facility. A second computing system can transmit instructions to autonomous robot devices to retrieve the physical objects from the facility. The second computing system can control the image capturing device of an autonomous robot device to capture a live image feed of at least one physical object picked up by the autonomous robot device. The second computing system can switch an input feed of the first computing system to display the live image feed on the interactive display of the first computing system. The second computing system can instruct the autonomous robot device to discard the physical objects picked up by the autonomous robot device and to pick up a replacement physical object.

21 Claims, 10 Drawing Sheets

Related U.S. Application Data

(60) Provisional application No. 62/452,121, filed on Jan. 30, 2017.

(51) Int. Cl.
*G05B 19/12* (2006.01)
*G05D 1/00* (2006.01)
*G05D 1/02* (2006.01)
*B25J 9/06* (2006.01)
*B25J 19/02* (2006.01)

(52) U.S. Cl.
CPC ......... *B65G 1/1375* (2013.01); *G05B 19/124* (2013.01); *G05D 1/0088* (2013.01); *G05D 1/027* (2013.01); *G05D 1/0234* (2013.01); *G05D 1/0297* (2013.01); *G05B 2219/23363* (2013.01); *G05B 2219/32388* (2013.01); *G05B 2219/36412* (2013.01); *G05B 2219/40507* (2013.01); *G05D 2201/0216* (2013.01); *Y10S 901/01* (2013.01)

(56) References Cited

U.S. PATENT DOCUMENTS

| | | | |
|---|---|---|---|
| 7,516,848 | B1 | 4/2009 | Shakes et al. |
| 7,693,757 | B2 | 4/2010 | Zimmerman |
| 7,894,939 | B2 | 2/2011 | Zini et al. |
| 8,204,624 | B2 | 6/2012 | Zini et al. |
| 8,594,834 | B1 | 11/2013 | Clark et al. |
| 8,892,241 | B2 | 11/2014 | Weiss |
| 9,050,723 | B1 | 6/2015 | Elazary et al. |
| 9,120,622 | B1 | 9/2015 | Elazary et al. |
| 9,129,251 | B2 | 9/2015 | Davidson |
| 9,205,886 | B1 | 12/2015 | Hickman et al. |
| 9,230,387 | B2 | 1/2016 | Stiernagle |
| 9,262,741 | B1 | 2/2016 | Williams et al. |
| 9,327,397 | B1 | 5/2016 | Williams et al. |
| 9,367,830 | B2 * | 6/2016 | Keller ............... B65G 1/1373 |
| 9,409,664 | B1 | 8/2016 | Vliet et al. |
| 2005/0238465 | A1 * | 10/2005 | Razumov ............... A47F 10/02 414/273 |
| 2007/0098264 | A1 | 5/2007 | Van Lier et al. |
| 2008/0077511 | A1 | 3/2008 | Zimmerman |
| 2010/0066497 | A1 | 3/2010 | Lim et al. |
| 2010/0114363 | A1 | 5/2010 | Cardoni |
| 2013/0145299 | A1 | 6/2013 | Steimle et al. |
| 2013/0238111 | A1 | 9/2013 | Whipple et al. |
| 2013/0262251 | A1 | 10/2013 | Wan et al. |
| 2014/0088764 | A1 | 3/2014 | Naidu et al. |
| 2014/0088939 | A1 | 3/2014 | Garant |
| 2014/0152507 | A1 | 6/2014 | McAllister |
| 2014/0180479 | A1 | 6/2014 | Argue et al. |
| 2014/0244026 | A1 | 8/2014 | Neiser |
| 2014/0257553 | A1 | 9/2014 | Shakes et al. |
| 2014/0279294 | A1 | 9/2014 | Field-Darragh et al. |
| 2014/0350717 | A1 | 11/2014 | Dagle et al. |
| 2015/0032252 | A1 | 1/2015 | Galluzzo et al. |
| 2015/0067080 | A1 | 3/2015 | Cho et al. |
| 2015/0073589 | A1 | 3/2015 | Khodl et al. |
| 2015/0332213 | A1 | 11/2015 | Galluzzo et al. |
| 2015/0356648 | A1 | 12/2015 | Baryakar et al. |
| 2015/0360865 | A1 | 12/2015 | Massey |
| 2016/0082589 | A1 | 3/2016 | Skrinde |
| 2016/0221187 | A1 | 8/2016 | Bradski et al. |
| 2016/0236867 | A1 | 8/2016 | Brazeau et al. |
| 2016/0260049 | A1 | 9/2016 | High et al. |
| 2016/0304280 | A1 | 10/2016 | Elazary et al. |
| 2016/0314514 | A1 | 10/2016 | High et al. |
| 2016/0379166 | A1 | 12/2016 | Singel et al. |

OTHER PUBLICATIONS

Kumar, Swagat et al., Robotics-as-a-Service: Transforming the Future of Retail, http://www.tcs.com/resources/white_papers/Pages/RoboticsasService. aspx, last viewed Sep. 9, 2016.

New robotic grocery store coming to Des Moine, YouTube, https://www.youtube.com/watch?v=LC-1PCu69M4, last viewed Jan. 24, 2018.

Gross, Zoë, Robotic dispensing device installed at St. Thomas hospital, The Pharmaceutical Journal, vol. 26, No. 7120, p6530655, Oct. 28, 2000.

Robotic Shelf Picking—IAM Robotics Automated Storage & Retrieval System (AS/RS), YouTube, https://www.youtube.com/watch?v=h9eRDyZJzSA, last viewed Jan. 24, 2018.

Written Opinion and International Search Report from related International Patent Application No. PCT/US2018/015514 dated Apr. 12, 2018.

Written Opinion and International Search Report from related International Patent Application No. PCT/US2018/015444,1 dated Mar. 22, 2018.

Written Opinion and International Search Report from related International Patent Application No. PCT/US2018/015386 dated Mar. 13, 2018.

Written Opinion and International Search Report from related International Patent Application No. PCT/US2018/015390 dated Apr. 6, 2018.

Written Opinion and International Search Report from related International Patent Application No. PCT/US2018/015475 dated Mar. 22, 2018.

U.S. Appl. No. 15/880,713, filed Jan. 26, 2018, Donald R. High et al.

\* cited by examiner

SYSTEMS AND METHODS FOR DISTRIBUTED AUTONOMOUS ROBOT INTERFACING USING LIVE IMAGE FEEDS

CROSS-REFERENCE TO RELATED PATENT APPLICATIONS

This application is a continuation application of U.S. patent application Ser. No. 15/880,713 filed Jan. 26, 2018, which claims priority to U.S. Provisional Application No.: 62/452,121 filed on Jan. 30, 2017, the content of each application is hereby incorporated by reference in its entirety.

BACKGROUND

Autonomous computing systems can be configured to perform various tasks. While performing these tasks autonomous computing systems can experience errors.

BRIEF DESCRIPTION OF DRAWINGS

Illustrative embodiments are shown by way of example in the accompanying drawings and should not be considered as a limitation of the present disclosure.

DETAILED DESCRIPTION

Figure 1A:
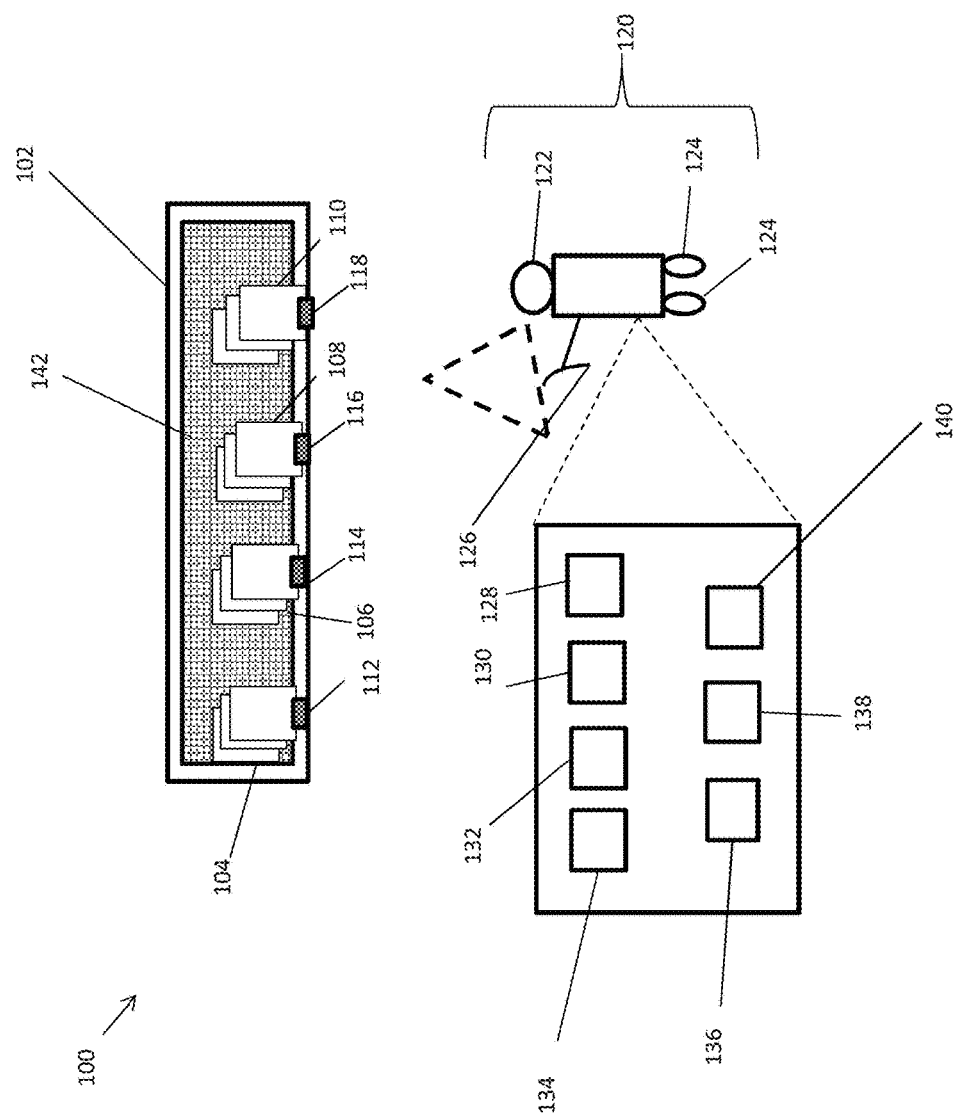
FIG. 1A is a block diagram illustrating an autonomous robot device in a facility according to exemplary embodiments of the present disclosure.

Described in detail herein is an autonomous fulfillment system. The system includes the first computing system, with an interactive display. The first computing system can transmit a request for physical objects from a facility. A second computing system can receive the request for the physical objects from the first computing system. The second computing system can transmit instructions to autonomous robot devices that can be configured to retrieve the physical objects from the facility. The second computing system can detect the autonomous robot device has picked up at least one of the physical objects, and can control the image capturing device of the autonomous robot device to capture a live image feed of the at least one physical object picked up by the at least autonomous robot device. The second computing system can switch an input feed of the first computing system to display the live image feed on the display of the first computing system. The second computing system can receive a second request from first computing system to discard the at least one of the physical objects picked up by the autonomous robot device and to pick up a replacement physical object. The second computing system, can transmit instructions to the at least one autonomous device to discard the at least one of the physical objects picked up by the at least one autonomous robot device and to pick up the replacement physical object.

In exemplary embodiments, an autonomous fulfillment system includes, a first computing system including an interactive display configured to transmit a first request for a plurality of physical objects from a facility. The system further includes autonomous robot devices including a controller, a drive motor, an articulated arm, a reader, an inertial navigation system and an image capturing device. The autonomous robot devices are configured to navigate autonomously through the facility. The system further includes a second computing system in communication with the first computing system and the autonomous robot devices. The second computing system is configured to receive the first request for the physical objects from the first computing system, transmit instructions the at least one of the autonomous robot devices to retrieve the plurality of physical objects from the facility, detect the at least one of the autonomous robot devices has picked up at least one of the physical objects, control the image capturing device of the at least one of the autonomous robot devices to capture a live image feed of the at least one physical object picked up by the at least one of the autonomous robot devices, switch an input feed of the first computing system to display the live image feed on the display of the first computing system, receive a second request from first computing system to discard the at least one of the physical objects picked up by the at least one autonomous robot device and to pick up a replacement physical object and transmit instructions to the at least one autonomous device to discard the at least one of the physical objects picked up by the at least one autonomous robot device and to pick up the replacement physical object.

The system further includes a database operatively coupled to the second computing system. The instructions from the second computing system can include one or more identifiers for the physical objects. The at least one of the autonomous robot devices is configured to query the database using the one or more identifiers for the physical objects to retrieve the locations at which the physical objects are disposed, navigate autonomously through the facility to the locations in response to operation of the drive motor by the controller, locate and scan one or more machine readable elements encoded with the one or more identifiers, detect that the physical objects are disposed at the locations via at least one image captured by the image capture device, pick up a first quantity of each of the plurality of physical objects using the articulated arm, and carry and navigate with the a first quantity of each of the physical objects to a specified location.

In some embodiments, the at least one of the autonomous robot devices is further configured to navigate to a storage container within the facility, deposit the first quantity of each of the physical object in the storage container, pick up the storage container and carry and navigate the storage container to the specified location. The specified location can be a parking lot in which motor vehicles are disposed. The first request received by the second computing system can include an identification number associated with at least one of the motor vehicles and a tag number associated with the at least one of the motor vehicles. The at least one of the autonomous robotic devices can be further configured to carry the storage container to the parking lot, detect the identification number of the at least one of the motor vehicles using the image capturing device, navigate to the at least one of the motor vehicles, autonomously open an access point of the at least one of the motor vehicles using the tag number, and deposit the storage container inside the at least one automobile via the access point.

The system further includes sensors disposed at the locations of each of the plurality of physical objects. The sensors can be configured to determine a set of attributes associated with each of the physical objects retrieved by the at least one of the autonomous robot devices. The second computing system can be further configured to transmit an alert to be displayed on the display of the first computing system based on the detected set of attributes for the at least one of the physical objects retrieved by the at least one of the autonomous robot devices.

FIG. 1A is a block diagram illustrating an autonomous robot device in an autonomous robot fulfillment system according to exemplary embodiments of the present disclosure. In exemplary embodiments, sets of physical objects 104-110 can be disposed in a facility 100 on a shelving unit 102, where each set of like physical objects 104-110 can be grouped together on the shelving unit 102. The physical objects in each of the sets 104-110 can be associated with identifiers encoded in machine-readable element 112-118, respectively, corresponding to the physical objects in the sets 104-110, where like physical objects can be associated with identical identifiers and disparate physical objects can be associated with different identifiers. In some embodiments, the machine readable elements 112-118 can be barcodes or QR codes.

The autonomous robot device 120 can be a driverless vehicle, an unmanned aerial craft, automated conveying belt or system of conveyor belts, and/or the like. Embodiments of the autonomous robot device 120 can include an image capturing device 122, motive assemblies 124, a picking unit 126, a controller 128, an optical scanner 130, a drive motor 132, a GPS receiver 134, accelerometer 136 and a gyroscope 138, and can be configured to roam autonomously through the facility 100. The picking unit 126 can be an articulated arm. The autonomous robot device 120 can be an intelligent device capable of performing tasks without human control. The controller 128 can be programmed to control an operation of the image capturing device 122, the optical scanner 130, the drive motor 132, the motive assemblies 124 (e.g., via the drive motor 132), in response to various inputs including inputs from the image capturing device 122, the optical scanner 130, the GPS receiver 134, the accelerometer 136, and the gyroscope 138. The drive motor 132 can control the operation of the motive assemblies 124 directly and/or through one or more drive trains (e.g., gear assemblies and/or belts). In this non-limiting example, the motive assemblies 124 are wheels affixed to the bottom end of the autonomous robot device 120. The motive assemblies 124 can be but are not limited to wheels, tracks, rotors, rotors with blades, and propellers. The motive assemblies 124 can facilitate 360 degree movement for the autonomous robot device 120. The image capturing device 122 can be a still image camera or a moving image camera.

The GPS receiver 134 can be a L-band radio processor capable of solving the navigation equations in order to determine a position of the autonomous robot device 120, determine a velocity and precise time (PVT) by processing the signal broadcasted by GPS satellites. The accelerometer 136 and gyroscope 138 can determine the direction, orientation, position, acceleration, velocity, tilt, pitch, yaw, and roll of the autonomous robot device 120. In exemplary embodiments, the controller can implement one or more algorithms, such as a Kalman filter, for determining a position of the autonomous robot device.

Sensors 142 can be disposed on the shelving unit 102. The sensors 142 can include temperature sensors, pressure sensors, flow sensors, level sensors, proximity sensors, biosensors, image sensors, gas and chemical sensors, moisture sensors, humidity sensors, mass sensors, force sensors and velocity sensors. At least one of the sensors 142 can be made of piezoelectric material as described herein. The sensors 142 can be configured to detect a set of attributes associated with the physical objects in the sets of like physical objects 104-110 disposed on the shelving unit 102. The set of attributes can be one or more of: quantity, weight, temperature, size, shape, color, object type, and moisture attributes.

The autonomous robot device 120 can receive instructions to retrieve physical objects from the sets of like physical objects 104-110 from the facility 100. For example, the autonomous robot device 120 can receive instructions to retrieve a predetermined quantity of physical objects from the sets of like physical objects 104 and 106. The instructions can include identifiers associated with the sets of like physical objects 104 and 106. The autonomous robot device 120 can query a database to retrieve the designated location of the set of like physical objects 104 and 106. The autonomous robot device 120 can navigate through the facility 100 using the motive assemblies 124 to the set of like physical objects 104 and 106. The autonomous robot device 120 can be programmed with a map of the facility 100 and/or can generate a map of the first facility 100 using simultaneous localization and mapping (SLAM). The autonomous robot device 120 can navigate around the facility 100 based on inputs from the GPS receiver 228, the accelerometer 230, and/or the gyroscope 232.

Subsequent to reaching the designated location(s) of the set of like physical objects 104 and 106, the autonomous robot device 120 can use the optical scanner 130 to scan the machine readable elements 112 and 114 associated with the set of like physical objects 104 and 106 respectively. In some embodiments, the autonomous robot device 120 can capture an image of the machine-readable elements 112 and 114 using the image capturing device 122. The autonomous robot device can extract the machine readable element from the captured image using video analytics and/or machine vision.

The autonomous robot device 120 can extract the identifier encoded in each machine readable element 112 and 114. The identifier encoded in the machine readable element 112 can be associated with the set of like physical objects 104 and the identifier encoded in the machine readable element 114 can be associated with the set of like physical objects 106. The autonomous robot device 120 can compare and confirm the identifiers received in the instructions are the same as the identifiers decoded from the machine readable elements 112 and 114. The autonomous robot device 120 can capture images of the sets of like physical objects 104 and 106 and can use machine vision and/or video analytics to confirm the set of like physical objects 104 and 106 are present on the shelving unit 102. The autonomous robot device 120 can also confirm the set of like physical objects 104 and 106 include the physical objects associated with the identifiers by comparing attributes extracted from the images of the set of like physical objects 104 and 106 in the shelving unit and stored attributes associated with the physical objects 104 and 106.

The autonomous robot device 120 can pick up a specified quantity of physical objects from each of the sets of like physical objects 104 and 106 from the shelving unit 102 using the picking unit 126. The autonomous robot device 120 can carry the physical objects it has picked up to a different location in the facility 100 and/or can deposit the physical objects on an autonomous conveyor belt for transport to a different location in the store.

The sensors 142 can detect when a change in a set of attributes regarding the shelving unit 102 in response to the autonomous robot device 120 picking up the set of like physical objects 104 and 106. For example, the sensors can detect a change in quantity, weight, temperature, size, shape, color, object type, and moisture attributes. The sensors 142 can detect the change in the set of attributes in response to the change in the set of attributes being greater than a predetermined threshold. The sensors 142 can encode the change in the set of attributes into electrical signals. The sensors can transmit the electrical signals to a computing system.

Figure 1B:
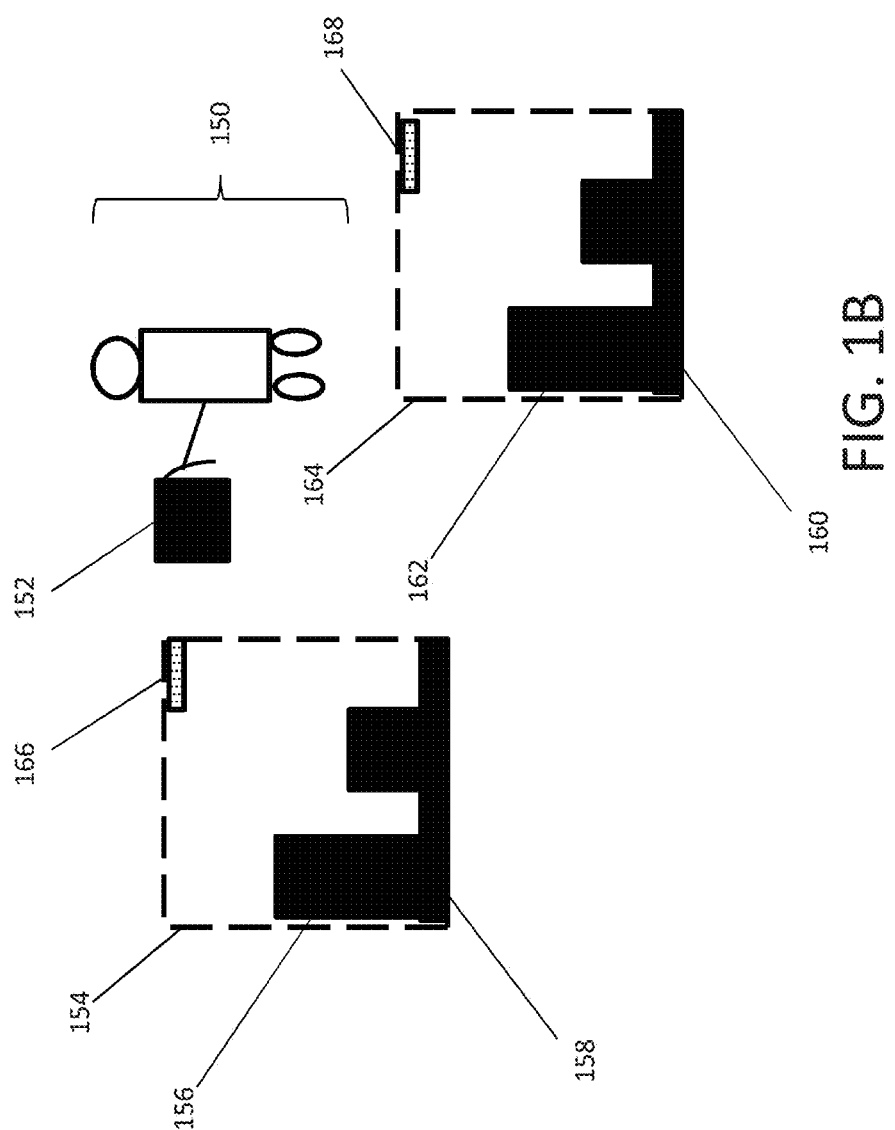
FIG. 1B is a block diagrams illustrating another autonomous robot device in an autonomous system according to exemplary embodiments of the present disclosure.

FIG. 1B is a block diagrams illustrating another autonomous robot device 150 in a facility according to exemplary embodiments of the present disclosure. The autonomous robot device 150 can transport the physical objects 152 to a different location in the facility and/or can deposit the physical objects on an autonomous conveyor belt or system of conveyor belts to transport the physical objects 152 to a different location. Storage containers 154 and 164 can be disposed at the different location. Machine-readable elements 166 and 168 can be disposed on the storage containers 154 and 164, respectively. The machine-readable elements 166 and 168 can be encoded with identifiers associated with the storage containers 154 and 164, respectively. The storage container 154 can store physical objects 156 and the storage container 164 can store physical objects 162. The storage containers 154 and 164 can also include sensors 158 and 160, respectively, disposed in the storage containers 154 and 156 (e.g., at a base of the storage containers 154 and 156). The sensors 158 and 160 can include temperature sensors, pressure sensors, flow sensors, level sensors, proximity sensors, biosensors, image sensors, gas and chemical sensors, moisture sensors, humidity sensors, mass sensors, force sensors and velocity sensors. The physical objects 156 and 162 can be placed in proximity to and/or on top of the sensors 158 and 160. In some embodiments, a least one of the sensors 158 and 160 can be made of piezoelectric material, as described herein. The sensors 158 and 160 can be configured to detect a set of attributes associated with the physical objects 156 and 162 disposed in the storage containers 154 and 164, respectively. The set of attributes can be one or more of: a quantity of physical objects, a weight of the physical objects, a temperature of the physical objects, a size of the physical objects, a shape of the physical objects, a color of the physical objects, an object type, and moisture emanating from the physical objects. The sensors can transmit the detected set of attributes to a computing system.

As mentioned above, the autonomous robot device 150 can receive instructions to retrieve physical objects 152. The instructions can also include an identifier of the storage container in which the autonomous robot device 150 should place the physical objects 152. The autonomous robot device 150 can navigate to the storage containers 154 and 164 with the physical objects 152 and scan the machine readable element 166 and 168 for the storage containers 154 and 164. The autonomous robot device 150 extract the identifiers from the machine readable elements 166 and 168 and determine in which storage container to place the physical objects 152. For example, the instructions can include an identifier associated with the storage container 154. The autonomous robot device 150 can determine from the extracted identifiers to place the physical objects 152 in the storage container 154. In another embodiment, the storage containers 154 and 164 can be scheduled for delivery. The instructions can include an address(es) to which the storage containers are being delivered. The autonomous robot device 150 can query a database to determine the delivery addresses of the storage containers 154 and 164. The autonomous robot device 150 can place the physical objects 152 in the storage container with a delivery address corresponding to the address included in the instructions. Alternatively, the instructions can include other attributes associated with the storage containers 154 and 164 by which the autonomous robot device 150 can determine the storage container 154 or 164 in which to place the physical objects 152. The autonomous robot device 150 can also be instructed to place a first quantity of physical objects 152 in the storage container 154 and a second quantity of physical objects 152 in storage container 164.

Figure 1C:
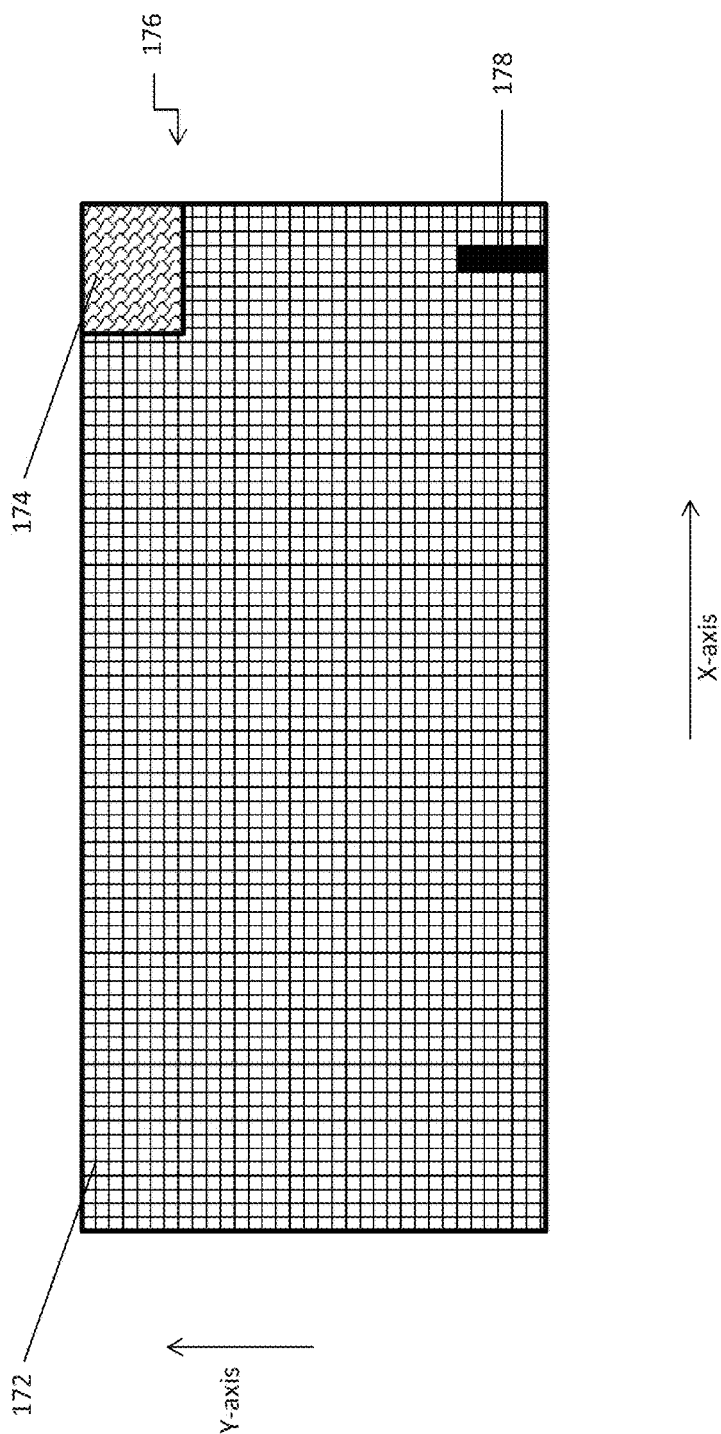
FIG. 1C illustrates an array of sensors in accordance with an exemplary embodiment.

FIG. 1C illustrates an array of sensors 176 in accordance with an exemplary embodiment. The array of sensors 176 can be disposed at the shelving units (e.g., embodiments of the shelving unit 102 shown in FIG. 1A) and/or base of the storage containers (e.g., embodiments of the containers 154 and 164 shown in FIG. 1B). The array of sensors 176 may be arranged as multiple individual sensor strips 172 extending along the shelving units and/or base of the storage containers, defining a sensing grid or matrix. The array of sensors 176 can be built into the shelving units and/or base of the storage containers itself or may be incorporated into a liner or mat disposed at the shelving units and/or base of the storage containers. Although the array of sensors 176 is shown as arranged to form a grid, the array of sensors can be disposed in other various ways. For example, the array of sensors 176 may also be in the form of lengthy rectangular sensor strips extending along either the x-axis or y-axis. The array of sensors 176 can detect attributes associated with the physical objects that are stored on the shelving units and/or the storage containers, such as, for example, detecting pressure or weight indicating the presence or absence of physical objects at each individual sensor 172. In some embodiments, the surface of the shelving unit is covered with an appropriate array of sensors 176 with sufficient discrimination and resolution so that, in combination, the sensors 172 are able to identify the quantity, and in some cases, the type of physical objects in the storage container or shelving units.

In some embodiments the array of sensors 176 can be disposed along a bottom surface of a storage container and can be configured to detect and sense various characteristics associated with the physical objects stored within the storage container. The array of sensors can be built into the bottom surface of the storage container or can be incorporated into a liner or mat disposed at the bottom surface of the storage container.

The array of sensors 176 may be formed of a piezoelectric material, which can measure various characteristics, including, for example, pressure, force, and temperature. While piezoelectric sensors are one suitable sensor type for implementing at least some of the sensor at the shelving units and/or in the containers, exemplary embodiments can implement other sensor types for determine attributes of physical objects including, for example, other types of pressure/weight sensors (load cells, strain gauges, etc.).

The array of sensors 176 can be coupled to a radio frequency identification (RFID) device 178 with a memory having a predetermined number of bits equaling the number of sensors in the array of sensors 176 where each bit corresponds to a sensor 172 in the array of sensors 178. For example, the array of sensors 176 may be a 16×16 grid that defines a total of 256 individual sensors 172 may be coupled to a 256 bit RFID device such that each individual sensor 172 corresponds to an individual bit. The RFID device including a 256 bit memory may be configured to store the location information of the shelving unit and/or tote in the facility and location information of merchandise physical objects on the shelving unit and/or tote. Based on detected changes in pressure, weight, and/or temperature, the sensor 172 may configure the corresponding bit of the memory located in the RFID device (as a logic "1" or a logic "0"). The RFID device may then transmit the location of the shelving unit and/or tote and data corresponding to changes in the memory to the computing system.

Figure 1D:
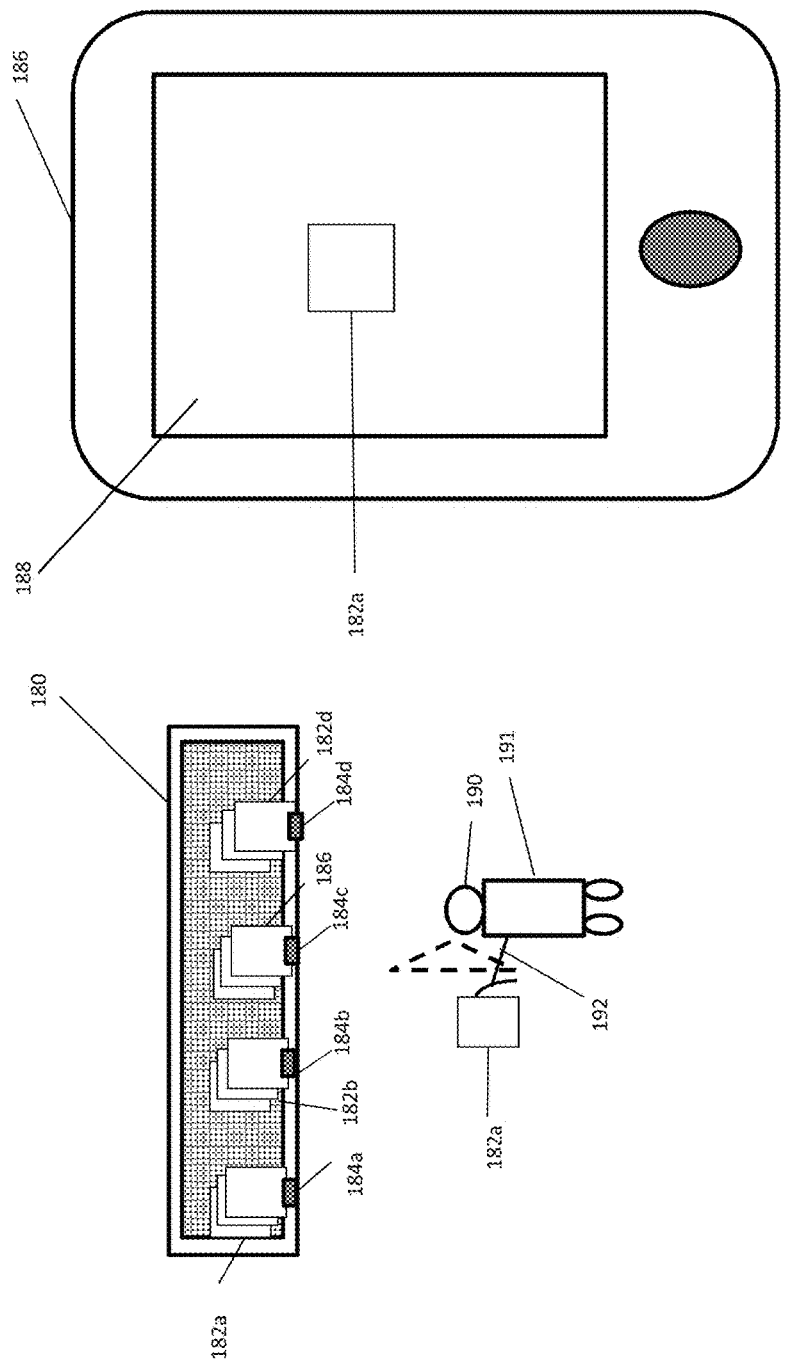
FIG. 1D illustrates a live image feed being displayed on a device in accordance with an exemplary embodiment.

FIG. 1D illustrates a live image feed being displayed on a device in accordance with an exemplary embodiment. In exemplary embodiments, a user can transmit a request for an autonomous robotic device 191 to retrieve physical objects 182*a* using a device 186 having an interactive display 188, such as a handheld device or a kiosk. For example, the autonomous robot device 191 can receive instructions to retrieve a predetermined quantity of physical objects from the sets of like physical objects 182*a*. The instructions can include identifiers associated with the sets of like physical objects 182*a*. The autonomous robot device 191 can query a database to retrieve the designated location of the set of like physical objects 182*a*, which can be disposed with respect to physical objects 182*b-d*. The autonomous robot device 191 can navigate to the designated location of the set of like physical objects 182*a*. The interactive display 188 of the device 182 can display the path the autonomous robot device 191 as the autonomous robot device 182 travels throughout the facility.

Subsequent to reaching the designated location of the set of like physical objects 182*a*, the autonomous robot device 191 can use scan the machine readable elements 184*a* associated with the set of like physical objects 182*a* respectively. In some embodiments, the autonomous robot device 191 can capture an image of the machine-readable element 184*a* using the image capturing device 190. The autonomous robot device 191 can extract the machine readable element from the captured image using video analytics and/or machine vision.

The autonomous robot device 191 can extract the identifier encoded in each machine readable element 184*a* and can compare and confirm the identifiers received in the instructions are the same as the identifiers decoded from the machine readable elements 184*a*. The autonomous robot device 191 can capture images of the sets of like physical objects 182*a* and can use machine vision and/or video analytics to confirm the set of like physical objects 182*a* are present on the shelving unit 102. The autonomous robot device 191 can also confirm the set of like physical objects 182*a* include the physical objects associated with the identifiers by comparing attributes extracted from the images of the set of like physical objects 182*a* in the shelving unit and stored attributes associated with the physical objects 182*a*. The autonomous robot device 191 can pick up a specified quantity of physical objects from each of the sets of like physical objects 182*a* from the shelving unit 180 using the picking unit 192. The autonomous robot device 191 can use the image capturing device 190 to capture a live video feed of the set of like physical objects 182*a*. The live video feed can be transmitted to be displayed on the interactive display 188 of the device 186. The live video feed can display the set of like physical objects 182*a* held by the autonomous robot device 191. The user can transmit instructions, via the device 186, to the autonomous robot device 191. For example, the user can wish to view a 360° view of the set of like physical objects 182*a*. In another example, the user can transmit instructions for the autonomous robotic device 191 to discard the set of like physical objects 182*a* and pick up another physical object such as 182*b*. In yet another example, the user can transmit instructions to the autonomous robotic device to pick up more or less quantity of the physical object 182*a*.

Figure 1E:
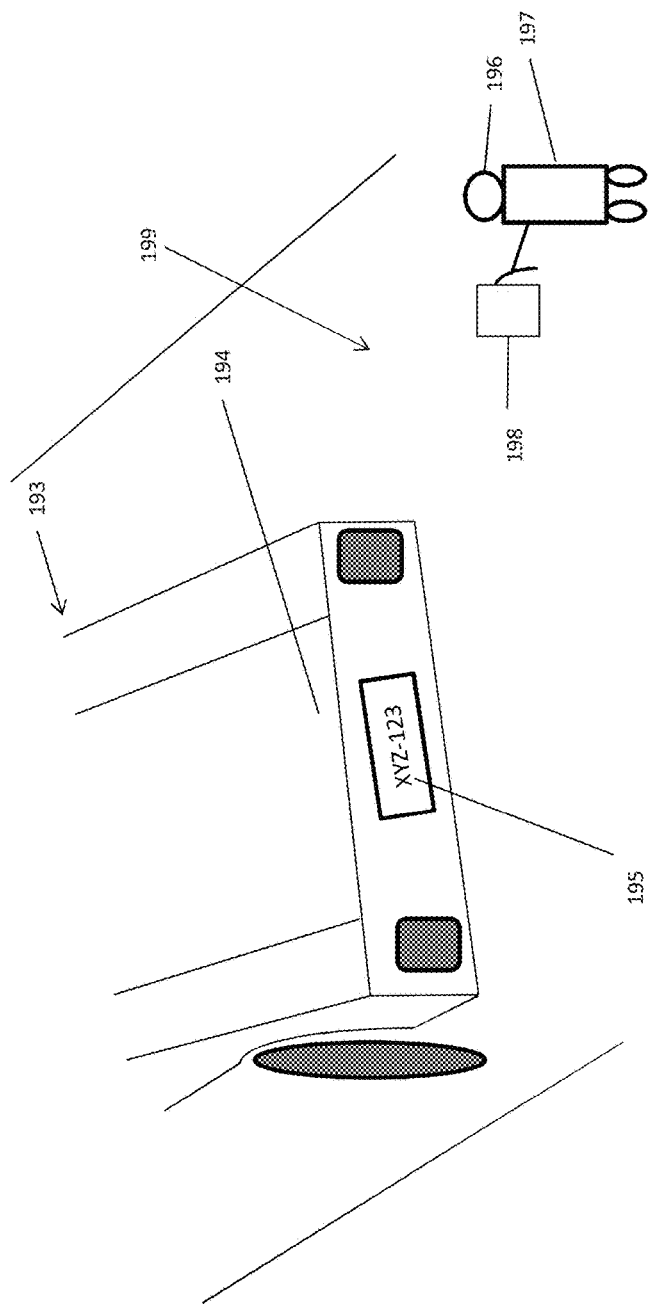
FIG. 1E illustrates an autonomous robotic device carrying a storage container to a vehicle in accordance with an exemplary embodiment.

FIG. 1E illustrates an autonomous robotic device carrying a storage container to a vehicle in accordance with an exemplary embodiment. The autonomous robotic device 197 can transport a storage container 198 containing physical objects to a specified location. The specified location can be a parking lot 199 of a facility. A vehicle 193 can be disposed in the parking lot 199 of the facility. The vehicle 193 can include a storage area 194 such as a trunk. The vehicle 193 can be identified by a license plate identification number 195.

The autonomous robotic device 197 can receive an access code, for accessing the storage area 194 of the vehicle. The autonomous robotic device can also receive an identification information of the vehicle such as the license plate number. The autonomous robotic device 197 can navigate to the vehicle and the autonomous robotic device 197 can identify the vehicle by detecting the license plate number 195 using an image capturing device 196. The autonomous robotic device 197 can compare the received identification number with the license plate number 195 displayed on the vehicle 193. In response to confirming, the received identification number of the vehicle matches the license plate number 195 displayed on the vehicle 193, the autonomous robotic device 197 can access the storage area 194 by using the received access code. The autonomous robotic device 197 can deposit the storage container 199 containing the physical objects in the storage area of the vehicle 193.

Figure 2:
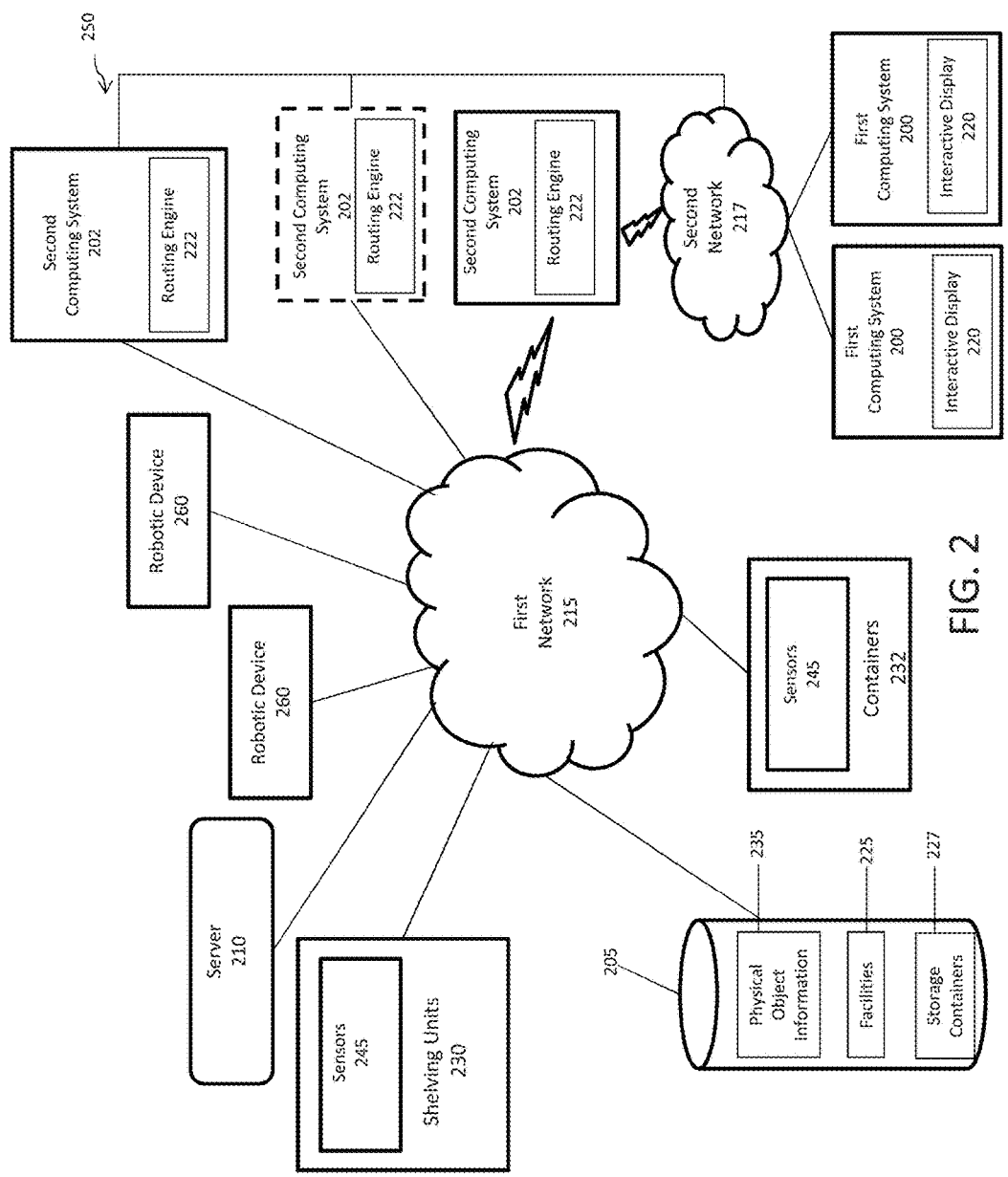
FIG. 2 is a block diagrams illustrating an autonomous robot interfacing system according to an exemplary embodiment.

FIG. 2 illustrates an exemplary autonomous robotic interfacing system 250 in accordance with an exemplary embodiment. The autonomous robotic interfacing system 250 can include one or more databases 205, one or more servers 210, one or more first computing systems 200, one or more second computing systems 202, sensors 245, and autonomous robotic devices 260. The sensors 245 can be an array of sensors disposed at a shelving unit 230 from which the sensors can detect attributes of the physical objects on the shelving units 230. Alternatively, the sensors 245 can be an array of sensors disposed at a bottom surface of a storage container 232 from which the sensors can detect attributes of the physical objects in the storage containers 232. In exemplary embodiments, the second computing system 202 can be in communication with the databases 205, the server(s) 210, the sensors 245, the autonomous robotic devices 260, via a first communications network 215. The first computing system 200 can be in communication with the second computing device, via the second communications network 217. The first computing system 200 can include an interactive display 220. The second computing system 202 can implement at least one instance of a routing engine 222 that can group requests for retrieving various physical objects from a facility, instruct autonomous robotic devices 260 to retrieve the physical objects from the facility, and provide a live image feed of the robotic device interacting with the physical objects in the facility.

In an example embodiment, one or more portions of the first and second communications network 215 and 217 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The server 210 includes one or more computers or processors configured to communicate with the first computing system 200, the second computing system 202 and the databases 205, via the first network 215. The server 210 hosts one or more applications configured to interact with one or more components computing system 200 and/or facilitates access to the content of the databases 205. In some embodiments, the server 210 can host the routing engine 222 or portions thereof. The databases 205 may store information/data, as described herein. For example, the databases 205 can include physical objects database 235, a facilities database 225 and a storage container database 227. The physical objects database 235 can store information associated with physical objects disposed at a facility and can be indexed via the decoded identifier retrieved by the identifier reader. The facilities database 225 can include information about the facility in which the physical objects are disposed. The storage container database 227 can store information to associate physical objects with storage containers 232 to identify which physical objects are to be deposited in which storage containers 232. The databases 205 and server 210 can be located at one or more geographically distributed locations from each other or from the first and second computing system 200 and 202. Alternatively, the databases 205 can be included within server 210. The first computing system 200 can be a kiosk or a handheld device.

In exemplary embodiments, a user can interact with the interactive display 220 of the first computing system 200 to transmit a request to retrieve physical objects disposed in one or more facilities. The request can include the identifiers of the physical objects and can be transmitted to the second computing system 202. The second computing system 200 can execute the routing engine 222 in response to receiving the request to retrieve the physical objects. The routing engine 222 can query the facilities database 225 to retrieve the locations of the requested physical objects within the one or more facilities. The autonomous robotic devices 260 can use location/position technologies including SLAM algorithms, LED lighting, RF beacons, optical tags, waypoints to navigate around the facility. The routing engine 222 can instruct one of the autonomous robotic devices 260 to retrieve the requested physical objects in the facility.

The autonomous robotic device 260 can receive instructions from the routing engine 222 to retrieve the physical objects and transport the physical objects to a location of the facility, including various storage containers 232. The physical objects can include a predetermined quantity of physical objects from different sets of like physical objects. The instructions can include identifiers associated with the physical objects and identifiers associated with the storage containers 232. The instructions can include identifiers for various storage containers 232. The retrieved physical objects can be deposited in different storage containers 232 based on attributes associated with the physical objects. The attributes can include: a delivery address of the physical objects, size of the physical objects and the type of physical objects. The autonomous robotic devices 260 can query the facilities database 225 to retrieve the locations of the physical objects in the assigned group of physical objects. The autonomous robotic device 260 can navigate to the physical objects. The path of the autonomous robotic device 260 as robotic device navigates to the physical objects can be displayed on the interactive display 220 of the first computing system 200. In one example, the routing engine 222 can track the robotic device using location/position technologies including LED lighting, RF beacons, optical tags and/or waypoints. The routing engine 222 can transmit the location information of the autonomous robotic device 260 display the location information on a map of the facility on the interactive display 220 of the first computing system 202.

Upon arriving at the designated location the autonomous robotic device 260 can scan a machine-readable element encoded with an identifier associated with each set of like physical objects. The autonomous robotic device 260 can decode the identifier from the machine-readable element and query the physical objects database 235 to confirm the autonomous robotic device 260 was at the correct location. The autonomous robotic device 260 can also retrieve stored attributes associated with the set of like physical objects in the physical objects database 235. The autonomous robotic device 260 can capture an image of the set of like physical objects and extract a set of attributes using machine vision and/or video analytics. The autonomous robotic device 260 can compare the extracted set of attributes with the stored set of attributes to confirm the set of like physical objects are same as the ones included in the instructions. The extracted and stored attributes can include, image of the physical objects, size of the physical objects, color of the physical object or dimensions of the physical objects. The types of machine vision and/or video analytics used by the routing engine 222 can be but are not limited to: Stitching/Registration, Filtering, Thresholding, Pixel counting, Segmentation, Inpainting, Edge detection, Color Analysis, Blob discovery & manipulation, Neural net processing, Pattern recognition, Barcode Data Matrix and "2D barcode" reading, Optical character recognition and Gauging/Metrology.

The autonomous robotic devices 260 can pick up a predetermined quantity of physical objects of the requested physical objects. The routing engine 222 can control the image capturing device of the autonomous robotic device 260 to capture a live image feed of the picked up physical object. In some embodiments, the first computing system 200 can transmit instructions to view a live image feed of some or all requested physical objects picked up by the autonomous robotic device 260. In other examples, the routing engine 222 can determine a live video image feed should be displayed on the interactive display 220 of the first computing device 200 based on a set of attributes detected by the sensors, as described herein.

The routing engine 222 can control the image capturing device of the autonomous robotic device 260 to capture a live image feed of the picked up physical object. The routing engine 222 can switch the input of the interactive display 220 of the first computing system 200 and display the live image feed of the picked up physical object on the interactive display 220 of the first computing system 200. The user can view the live image feed of the picked up physical object. The user can transmit further requests to the second computing system 202 from the first computing system 200 using the interactive display 220. For example, the user can transmit a request from the first computing system 200 to display a 360° of the picked up physical object. The routing engine 222 can instruct the autonomous robotic device 260 to show a 360° of the picked up object. In another example, the user can transmit a request from the first computing system 200 to the second computing system 202 to discard the picked up physical object and/or pick up a different physical object. The routing engine 222 can instruct the autonomous robotic device 260 to discard the picked physical object and/or pick up a different physical object. In yet another example, the user can transmit a request from the first computing system 200 to the second computing system 202 to pick up more or less of the quantity of the picked up physical object. The routing engine 222 can instruct the autonomous robotic device 260 to pick up more or less of the quantity of the picked up physical object.

The autonomous robotic device 260 carry the physical objects to a location of the facility including storage containers 232. The storage containers 232 can have machine-readable elements disposed on the frame of the storage containers 232. The autonomous robotic devices 260 can scan the machine-readable elements of the storage containers 232 and decode the identifiers from the machine-readable elements. The autonomous robotic devices 260 can compare the decoded identifiers with the identifiers associated with the various storage containers 232 included in the instructions. The autonomous robotic devices 260 can deposit the physical objects from the one or more groups assigned to the autonomous robotic device 260 in the respective storage containers 232. For example, the autonomous robotic device 260 can deposit a first subset of physical objects from the one or more groups of physical objects in a first storage container 232 and a second subset of physical objects from one or more groups of physical objects in a second storage container 232 based on the instructions. The autonomous robotic device 260 can carry the storage container 232 to a different location. For example, the user can transmit a request from the first computing system 200 to the second computing system 202, to deliver the storage container 232 to the trunk of the user's vehicle located in the parking lot of the facility. The request can include an identifier, such as the license plate number or yin number, of the vehicle, a general location of the vehicle, and an access code to access the trunk of the vehicle. The routing engine 222 can instruct the autonomous robotic device 260 to transport the storage container 232 to the vehicle in the parking lot. The autonomous robotic device 260 can carry the storage container to a parking lot and search for the user's vehicle using the identifier of the vehicle, via the image capturing device. The autonomous robotic device 260 can detect the identifier of the vehicle in the parking lot, navigate to the vehicle with the storage container 232, input the access code, and open the trunk of the vehicle. The autonomous robotic device 260 can deposit the storage container 232 inside the trunk of the vehicle. In other embodiments, the robotic device can access the front or back seat of the vehicle, via the access code and deposit the storage container 232 in the back or front seat. In another embodiment, the vehicle can be a delivery vehicle and the autonomous robotic device can deposit the storage container 232 in the storage area of the delivery vehicle.

As mentioned above, sensors 245 can be disposed at the shelving unit 230 in which the requested physical objects are disposed. The sensors 245 disposed at the shelving unit 230 can transmit a first of attributes associated with the physical objects disposed on the shelving unit 230, encoded into electrical signals to the second computing system 202 in response to the autonomous robotic device 260 picking up the physical objects from the shelving unit 230. The sensors 245 can be coupled to an RFID device which can transmit the signals to the second computing system 202 via RFID readers. The first set of attributes can be a change in weight, temperature and moisture on the shelving unit 230. The routing engine 222 can determine an error associated with the physical objects which were picked up from the shelving unit 230 based on the first set of attributes. The error could be one or more of: incorrect physical objects, incorrect quantity of physical objects and/or damaged or decomposing physical objects deposited in the storage containers 232.

For example, the physical objects can be perishable items. The robotic device 260 can pick up the perishable items and based on the removal of perishable items, the sensors 245 disposed at the shelving unit 230, can detect a change in the moisture level. The sensors 245 can encode the change in moisture level in signals and transmit the signals to the second computing system 202, e.g., via RFID readers. The routing engine 222 can decode the signals and determine the perishable items picked up by the robotic device 260 are damaged or decomposing based on the detected change in moisture level. The routing engine 222 can transmit an alert to the first computing system 200 to be displayed on the interactive display 220. The user can be presented an option to view the physical object, to ignore the error or to have the routing engine 222 handle the error.

In the event, the user selects view the physical object, the routing engine 222 can control the image capturing device of the autonomous robotic device 260 to capture a live image feed of the picked up physical object. The routing engine can switch the input of the interactive display 220 on the first computing system 200 and display the live image feed on the interactive display 220 of the first computing system 200. The user can transmit from the first computing system 200 to the second computing system 202, a request to discard the physical object, and/or pick up a different physical object. The routing engine 222 can instruct the robotic device to discard the physical object and/or pick up a different physical object.

In the event, the user selects for the routing engine 222 to handle the error. The routing engine 222 can establish an interface with the robotic device 260 and can transmit instructions to the robotic device 260 through the interface to discard the physical object and/or pick up a different physical object.

The sensors 245 can also be disposed at the base of the storage containers 232. The sensors 245 disposed at the base of the storage containers 232 can encode a second set of attributes associated with the physical objects disposed in the storage containers 232 and transmit the signals to the second computing system 202. The sensors 245 can be coupled to an RFID device which can transmit signals to the second computing system 202, e.g., via RFID readers. The second computing system can execute the routing engine 222 in response to receiving the signals. The second set of attributes can be a change in weight, temperature and moisture in the storage containers 232. The routing engine 222 can decode the first set of attributes from the signals. The routing engine 222 can determine whether there was an error in the physical objects deposited in the storage containers 232 based on the second set of attributes. The error could be one or more of: incorrect physical objects deposited in the storage containers 232, incorrect quantity of physical objects deposited in the storage containers 232 and/or damaged or decomposing physical objects deposited in the storage containers 232.

For example, the sensors 245 disposed at the base of the storage containers 232 can detect an increase in weight in response to the robotic device 260 depositing an item in the storage container 232. The sensors 245 can encode the increase in weight in electrical signals and transmit signals corresponding to the electrical signals to the second computing system 202. The second computing system 202 can execute the routing engine 222 in response to receiving the electrical signals. The routing engine 222 can decode the signals and query the storage container database 227 to determine which physical objects are designated to be deposited in the storage container 232. The routing engine 222 can query the physical object information database 235 to determine the weights of the physical objects designated to be deposited in the storage container 232. The routing engine 222 can determine an incorrect physical object was placed in the storage container 232 based on the increase in weight. The routing engine 222 can establish an interface with the robotic device 260 and can transmit instructions to the robotic device 260 through the interface to remove the deposited physical object from the storage container 232. The routing engine 222 can also transmit instructions to the robotic device through the interface 260 to deposit the physical object in a different storage container 232.

In some embodiments, the sensors 245 can be disposed throughout the facility. The sensors 245 can be RFID tags, beacons or other Near Field Communication (NFC) devices. The sensors 245 can detect as the robot devices 260 pass by the sensors 245 while the robotic device 260 is in route to pick up the physical objects from the shelving unit 230 or in route to deposit the physical objects in the storage containers 232. The sensors 245 can encode the location at which the sensors 245 detected the robotic device 260 into an electrical signal and transmit the signal to the second computing system 202. The second computing system 202 can execute the routing engine 222 in response to receiving the signal. The routing engine 222 can query the physical object information database 235 and/or the facilities database 225 to determine whether the robotic device 260 is in the correct route to pick up the physical objects from the shelving unit 230 or to deposit the physical objects in the storage containers 232. In response to determining the robot device is in the incorrect route to either the shelving unit 230 or the storage containers 232, the routing engine 222 can establish an interface with the robot device 260. The routing engine 222 can re-route the robotic device 260 onto the correct path, via the interface.

As a non-limiting example, the autonomous robotic interfacing system 250 can be implemented in a retail store and products can be disposed at the retail store. The first computing system 200 can receive instructions to retrieve products from a retail store based on a completed transaction at a physical or retail store. The first computing system 200 can receive instructions from multiple different sources. For example, the first computing system 200 can receive instructions to retrieve products for various customers. The first computing system 200 can receive the instructions to from disparate sources 240 such as a mobile device executing an instance of the retail store's mobile application or a computing device accessing the online store. The first computing system 200 can execute the routing engine 222 in response to receiving the instructions. The routing engine can query the facilities database 225 to retrieve the location of the products in the retail store and a set of attributes associated with the requested products. The routing engine 222 can divide the requested products into groups based on the locations of the products within the retail store and/or the set of attributes associated with the products. For example, the routing engine 222 can divide the products into groups based on a location of the products, the priority of the products, the size of the products or the type of the products.

The routing engine 222 can instruct the autonomous robotic devices 260 to retrieve one or more groups of products in the retails store and transport the products to a location of the facility including various storage containers 232. The one or more groups of physical objects can include a predetermined quantity of physical objects from different sets of like physical objects. The instructions can include identifiers associated with the products and identifiers associated with the storage containers 232. The instructions can include identifiers for various storage containers 232. The retrieved products can be deposited in different storage containers 232 based on attributes associated with the products. The attributes can include: a delivery address of the products, priority assigned to the products, size of the products and the type of products. The autonomous robotic devices 260 can query the facilities database 225 to retrieve the locations of the products in the assigned group of products. The autonomous robotic device 260 can navigate to the products and scan a machine-readable element encoded with an identifier associated with each set of like products. The autonomous robotic device 260 can decode the identifier from the machine-readable element and query the physical objects database 235 to confirm the autonomous robotic device 260 was at the correct location. The autonomous robotic device 260 can also retrieve stored attributes associated with the set of like products in the physical objects database 235. The autonomous robotic device 260 can capture an image of the set of like physical objects and extract a set of attributes using machine vision and/or video analytics. The autonomous robotic device 260 can compare the extracted set of attributes with the stored set of attributes to confirm the set of like products are same as the ones included in the instructions. In autonomous robotic device 260 can pick up the products.

The routing engine 222 can control the image capturing device of the autonomous robotic device 260 to capture a live image feed of the picked up products. The routing engine can switch the input of the interactive display 220 on the first computing system 200 and display the live image feed of the picked up products on the interactive display 220 of the first computing system 200. The user can view the life image feed of the picked up each or one or more products. The user can transmit further requests to the second computing system 202 from the first computing system 200 using the interactive display 220. For example, the user can transmit a request from the first computing system 200 to display a 360° of the picked up products. The routing engine 222 can instruct the robotic device 260 to show a 360° of the picked up products. In another example, the user can transmit a request from the first computing system 200 to the second computing system 202 to discard the picked up products and/or pick up a different products. The routing engine 222 can instruct the autonomous robotic device 260 to discard the picked products and/or pick up a different products. In yet another example, the user can transmit a request from the first computing system 200 to the second computing system 202 to pick up more or less of the quantity of the picked up products. The routing engine 222 can instruct the autonomous robotic device 260 to pick up more or less of the quantity of the picked up products.

The autonomous robotic devices 260 can pick up the products in the group of products and transport the products to a location of the facility including storage containers 232. The storage containers 232 can have machine-readable elements disposed on the frame of the storage containers 232. The autonomous robotic devices 260 can scan the machine-readable elements of the storage containers 232 and decode the identifiers from the machine-readable elements. The autonomous robotic devices 260 can compare the decoded identifiers with the identifiers associated with the various storage containers 232 included in the instructions. The autonomous robotic devices 260 can deposit the products from the group of products assigned to the autonomous robotic device 260 in the respective storage containers 232. For example, the autonomous robotic device 260 can deposit a first subset of products from the group of physical objects in a first storage container 232 and a second subset of products from the group of physical objects in a second storage container 232 based on the instructions. The autonomous robotic device 260 can transfer items from the first storage container 232 to a different storage container 232. In some embodiments, the autonomous robotic device 260 can determine the storage container 232 is full or the required amount of products are in the storage container 232. The autonomous robotic device 260 can pick up the storage container 232 and transport the storage container 232 to a different location in the facility. The different location can be a loading dock for a delivery vehicle or a location where a customer is located. In one example, the autonomous robotic device 260 can load the items from the storage container on to the delivery vehicle e.g. multi-modal transport within the facility. For example, the autonomous robotic device 260 can dispense an item onto a conveyor which transfers to staging area where an aerial unit picks up for delivery. In another embodiment the autonomous robotic device 260 can be an autonomous shelf dispensing unit. The shelf dispensing unit can dispense the items into the storage containers.

The autonomous robotic device 260 can pick up the storage containers and transport the storage containers to a location in the retail store or outside the retail store. For example, the user can transmit a request from the first computing system 200 to the second computing system 202, to deliver the storage container 232 to the trunk of the user's vehicle located in the parking lot of the retail store. The request can include an identifier, such as the license plate number or vin number, of the vehicle, a general location of the vehicle, and an access code to access the trunk of the vehicle. The routing engine 222 can instruct the autonomous robotic device 260 to transport the storage container 232 to the vehicle in the parking lot. The autonomous robotic device 260 can carry the storage container to a parking lot and search for the user's vehicle using the identifier of the vehicle, via the image capturing device. The autonomous robotic device 260 can detect the identifier of the vehicle in the parking lot, navigate to the vehicle with the storage container 232, input the access code, and open the trunk of the vehicle. The autonomous robotic device 260 can deposit the storage container 232 inside the trunk of the vehicle. In other embodiments, the autonomous robotic device can access the front or back seat of the vehicle, via the access code and deposit the storage container 232 in the back or front seat. In another embodiment, the vehicle can be a delivery vehicle and the autonomous robotic device can deposit the storage container 232 in the storage area of the delivery vehicle.

Sensors 245 can be disposed at the shelving unit 230 in which the requested products are disposed. The sensors 245 disposed at the shelving unit 230 can transmit a first of attributes associated with the products disposed on the shelving unit 230, encoded into electrical signals to the second computing system 202 in response to the robotic device 260 picking up the products from the shelving unit 230. The second computing system 202 can be a user interface on a smart device such as a smart phone or headset. The first set of attributes can be a change in weight, temperature and moisture on the shelving unit 230. For example, the change in moisture can indicate a damaged, decomposing or un-fresh perishable items (i.e. brown bananas). The second computing system 202 can execute the routing engine 222 in response to receiving the electrical signals and the routing engine 222 can decode the first set of attributes from the electrical signals. The routing engine 222 can determine an error associated with the products which were picked up from the shelving unit 230 based on the first set of attributes. The error could be one or more of: incorrect products, incorrect quantity of products and/or damaged or decomposing products deposited in the storage containers 232.

For example, the products can be perishable items. The autonomous robotic device 260 can pick up the perishable items and based on the removal of perishable items, the sensors 245 disposed at the shelving unit 230, can detect a change in the moisture level. The sensors 245 can encode the change in moisture level in an electrical signals and transmit the electrical signals to the second computing system 202. The second computing system can execute the routing engine 222 in response to receiving the electrical signals. The routing engine 222 can decode the electrical signals and determine the perishable items picked up by the robotic device 260 are damaged or decomposing based on the detected change in moisture level. The routing engine 222 can establish an interface between the autonomous robotic device 260 and the routing engine 222. The routing engine 222 can send new instructions through the interface to the autonomous robotic device to pick up new perishable items and discard of the picked up perishable items.

In the event, the user selects view the products picked up by the autonomous robotic device 260, the routing engine 222 can control the image capturing device of the autonomous robotic device 260 to capture a live image feed of the picked up products. The routing engine can switch the input of the interactive display 220 on the first computing system 200 and display the live image feed on the interactive display 220 of the first computing system 200. The user can transmit from the first computing system 200 to the second computing system 202, a request to discard the product, and/or pick up a different product. The routing engine 222 can instruct the autonomous robotic device to discard the physical object and/or pick up a different product.

The sensors 245 can also be disposed at the base of the storage containers 232. The sensors 245 disposed at the base of the storage containers 232 can encode a second set of attributes associated with the products disposed in the storage containers 232 and transmit the electrical signals to the second computing system 202. The second computing system can execute the routing engine 222 in response to receiving the electrical signals. The second set of attributes can be a change in weight, temperature and moisture in the storage containers 232. The routing engine 222 can decode the first set of attributes from the electrical signals. The routing engine 222 can determine whether there was an error in the products deposited in the storage containers 232 based on the second set of attributes. The error could be one or more of: incorrect products deposited in the storage containers 232, incorrect quantity of products deposited in the storage containers 232 and/or damaged or decomposing products deposited in the storage containers 232.

For example, the sensors 245 disposed at the base of the storage containers 232 can detect an increase in weight in response to the robotic device 260 depositing an item in the storage container. The sensors 245 can encode the increase in weight in electrical signals and transmit the electrical signals to the second computing system 202. The second computing system 202 can execute the routing engine 222 in response to receiving the electrical signals. The routing engine 222 can decode the electrical signals and query the storage container database 227 to determine which products are designated to be deposited in the storage container. The routing engine 222 can query the physical object information database 235 to determine the weights of the products designated to be deposited in the storage container 232. The routing engine 222 can determine the an incorrect physical object was placed in the storage container 232 based on the increase in weight. The routing engine 222 can establish an interface with the autonomous robotic device 260 and can transmit instructions to the autonomous robotic device 260 through the interface to remove the deposited physical object from the storage container 232. The routing engine 222 can also transmit instructions to the autonomous robotic device through the interface 260 to deposit the physical object in a different storage container 232.

In some embodiments, the second computing system can be a user facing computing system 202 and the interface can be a chatroom between the autonomous robotic device 260 and a customer and/or an employee. The chatroom interface may allow and employee or customer to select alternate items. The routing engine 222 can execute an autonomous computerized script which can provide pre-programmed responses by recognizing words in the chatroom. For example, the autonomous robotic device 260 can recognize a product name and the term "location." In response, the autonomous robotic device 260 provides the location of the product in the facility. The second computing system 202 can also establish an interface to the first computing system 200 to control functions such as task management and/or alternate product options.

Figure 3:
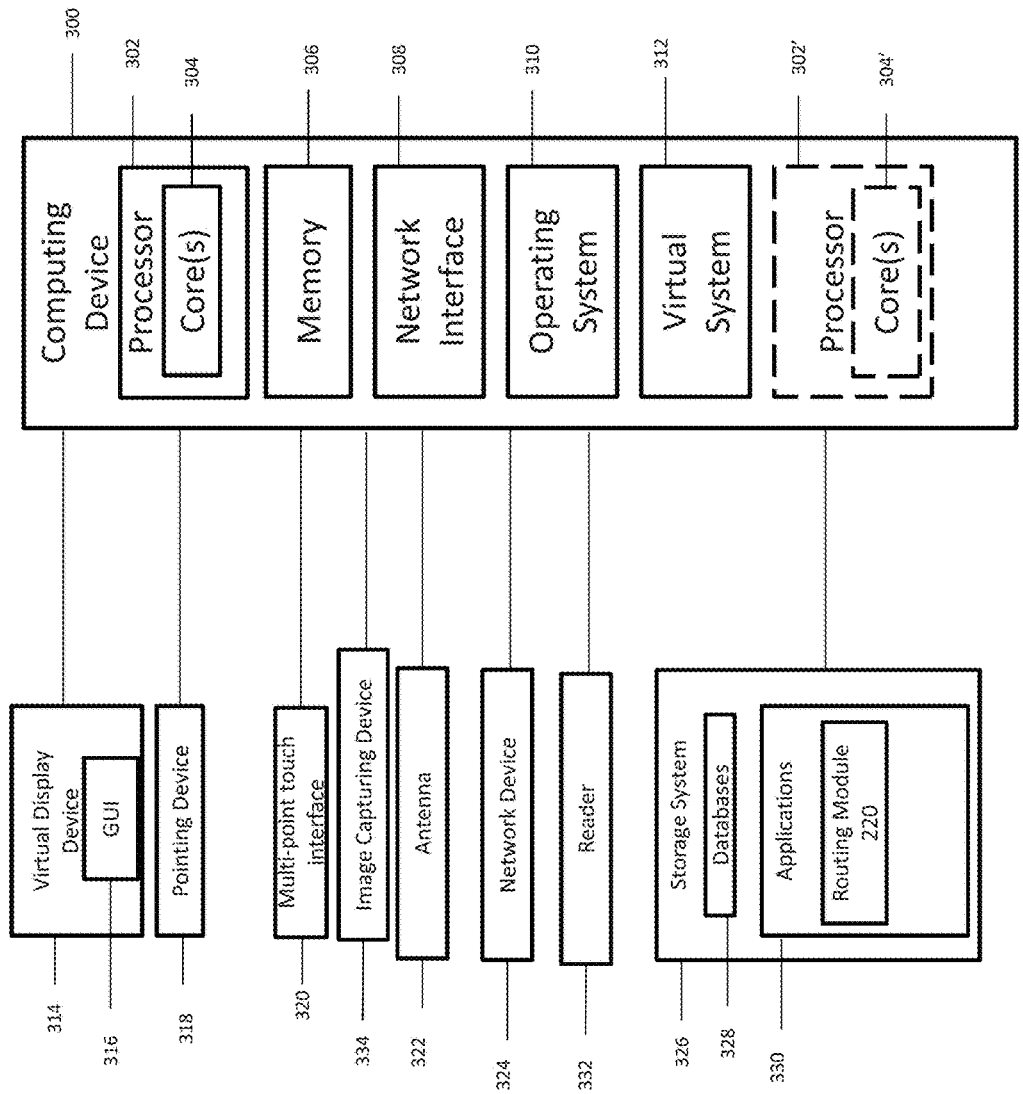
FIG. 3 is a block diagrams illustrating of an exemplary computing device in accordance with an exemplary embodiment.

FIG. 3 is a block diagram of an example computing device for implementing exemplary embodiments of the present disclosure. Embodiments of the computing device 300 can implement embodiments of the routing engine. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330 such as the routing engine 222) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments of the present disclosure. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

A user may interact with the computing device 300 through a visual display device 314, such as a computer monitor, which may display one or more graphical user interfaces 316, multi touch interface 320, a pointing device 318, an image capturing device 334 and an reader 332.

The computing device 300 may also include one or more storage devices 326, such as a hard-drive, CD-ROM, or other computer readable media, for storing data and computer-readable instructions and/or software that implement exemplary embodiments of the present disclosure (e.g., applications). For example, exemplary storage device 326 can include one or more databases 328 for storing information associated with physical objects disposed at a facility and can be indexed via the decoded identifier retrieved by the identifier reader, information to associate physical objects with the storage containers within which the physical objects are to be deposited and information about the facility in which the physical objects are disposed. The databases 328 may be updated manually or automatically at any suitable time to add, delete, and/or update one or more data items in the databases.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run any operating system 310, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or any other operating system capable of running on the computing device 300 and performing the operations described herein. In exemplary embodiments, the operating system 310 may be run in native mode or emulated mode. In an exemplary embodiment, the operating system 310 may be run on one or more cloud machine instances.

Figure 4:
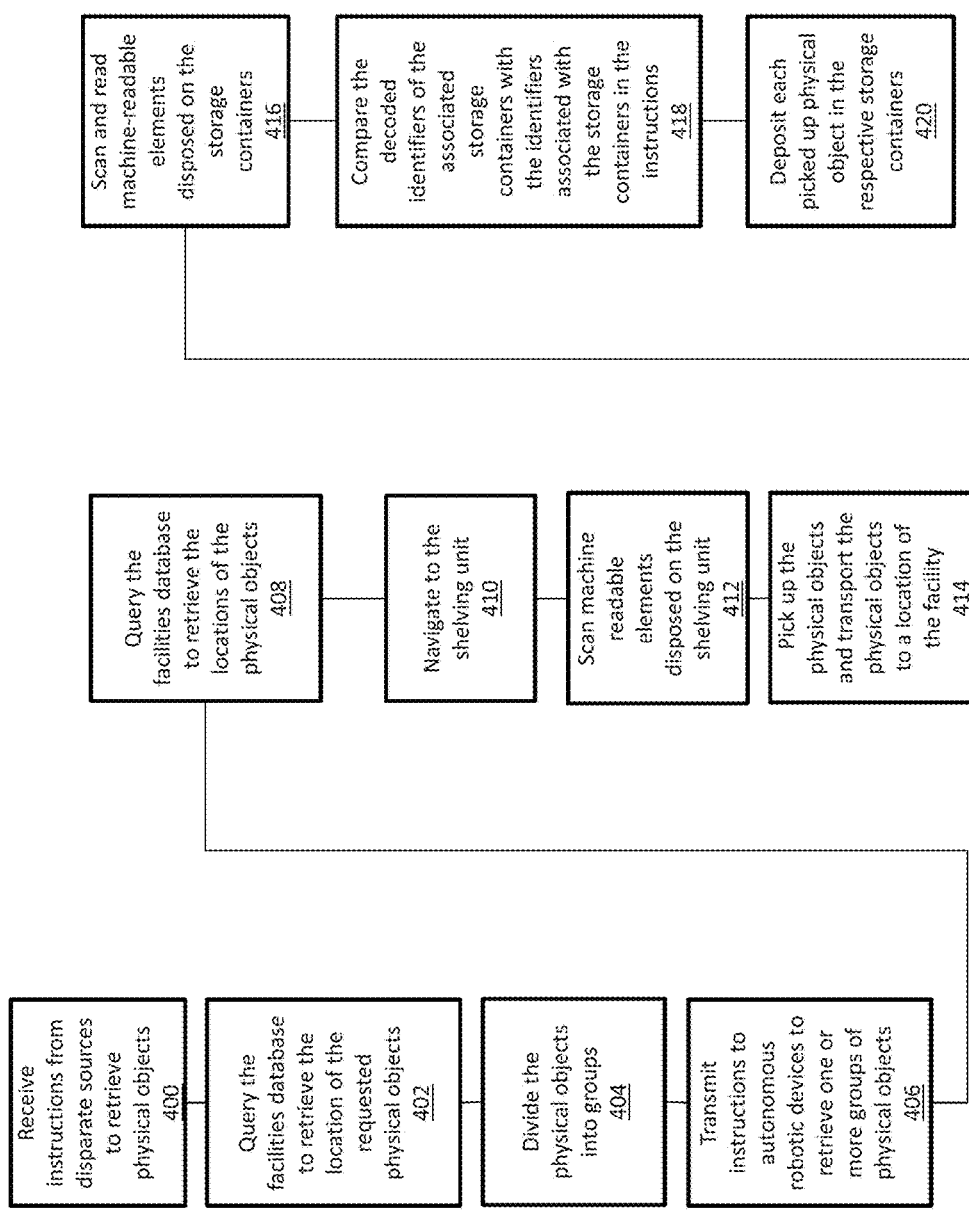
FIG. 4 is a flowchart illustrating an exemplary process of autonomous robotic fulfillment system in accordance with an exemplary embodiment.

FIG. 4 is a flowchart illustrating an example process of embodiments of the autonomous robotic fulfillment system according to the present disclosure. In operation 400, a second computing system (e.g., second computing system 202 as shown in FIG. 2) can receive instructions from a first computing system (e.g., first computing system 186, 200 as shown in FIGS. 1D and 2) to retrieve physical objects (e.g., physical objects 104-110, 152, 156, 162, 182a-e as shown in FIGS. 1A-B and D) from a facility. The second computing system can execute the routing engine (e.g., routing engine 222 as shown in FIG. 2) in response to receiving the instructions. In operation 402, the routing engine can query the facilities database (e.g., the facilities database 225) to retrieve the location of the requested physical objects. The routing engine can query the physical objects database (as physical objects database 235 shown in FIG. 2) to retrieve a set of attributes associated with the requested physical objects. In operation 404, the routing engine can divide the requested physical objects into groups based on the location and/or set of attributes associated with the physical objects.

In operation 406, the routing engine can transmit instructions to various autonomous robotic devices (e.g. autonomous robotic devices 120, 150 and 260 as shown in FIGS. 1A-B and 2) disposed in a facility to retrieve one or more groups of physical objects and deposit the physical objects in one or more storage containers (e.g. storage containers 154, 164 and 232 as shown in FIGS. 1B and 2). The instructions can include the identifiers associated with the physical objects and identifiers associated with the storage containers in which to deposit the physical objects. In operation 408, the autonomous robot device can query the facilities database to retrieve the locations of the physical objects within the facility. In operation 410, the autonomous robot device can navigate to the shelving unit (e.g. shelving unit 102 and 230 as shown in FIGS. 1A and 2) in which the physical objects are disposed. In operation 412, the autonomous robot device can scan machine readable elements disposed on the shelving unit, encoded with identifiers associated with the requested physical objects. The autonomous robot device can query the physical objects database using the identifiers to retrieve a set of stored attributes associated with the physical objects. The autonomous robot device can capture an image of the physical objects and extract a set of attributes associated with the physical objects the image. The autonomous robot device can compare the stored set of attributes associated with the physical objects and the extracted set of attributes associated with the physical objects to confirm the physical objects disposed on the shelf is the same physical object the autonomous robot device was instructed to pick up.

In operation 414, the autonomous robot device can pick up the physical objects and transport the physical objects to a location of the facility including storage containers. In operation 416, the autonomous robot device can scan and read machine-readable elements (e.g., machine-readable elements 166, 168 as shown in FIG. 1B) disposed on the storage containers. The machine readable elements can be encoded with identifiers associated with the storage containers. In operation 418, the autonomous robot device can compare the decoded identifiers of the associated storage containers with the identifiers associated with the storage containers in the instructions. The autonomous robot device can determine which physical objects among the physical objects the autonomous robot device has picked up, are associated with which storage containers. In operation 420, the autonomous robot device can deposit each picked up physical object in the respective storage containers.

Figure 5:
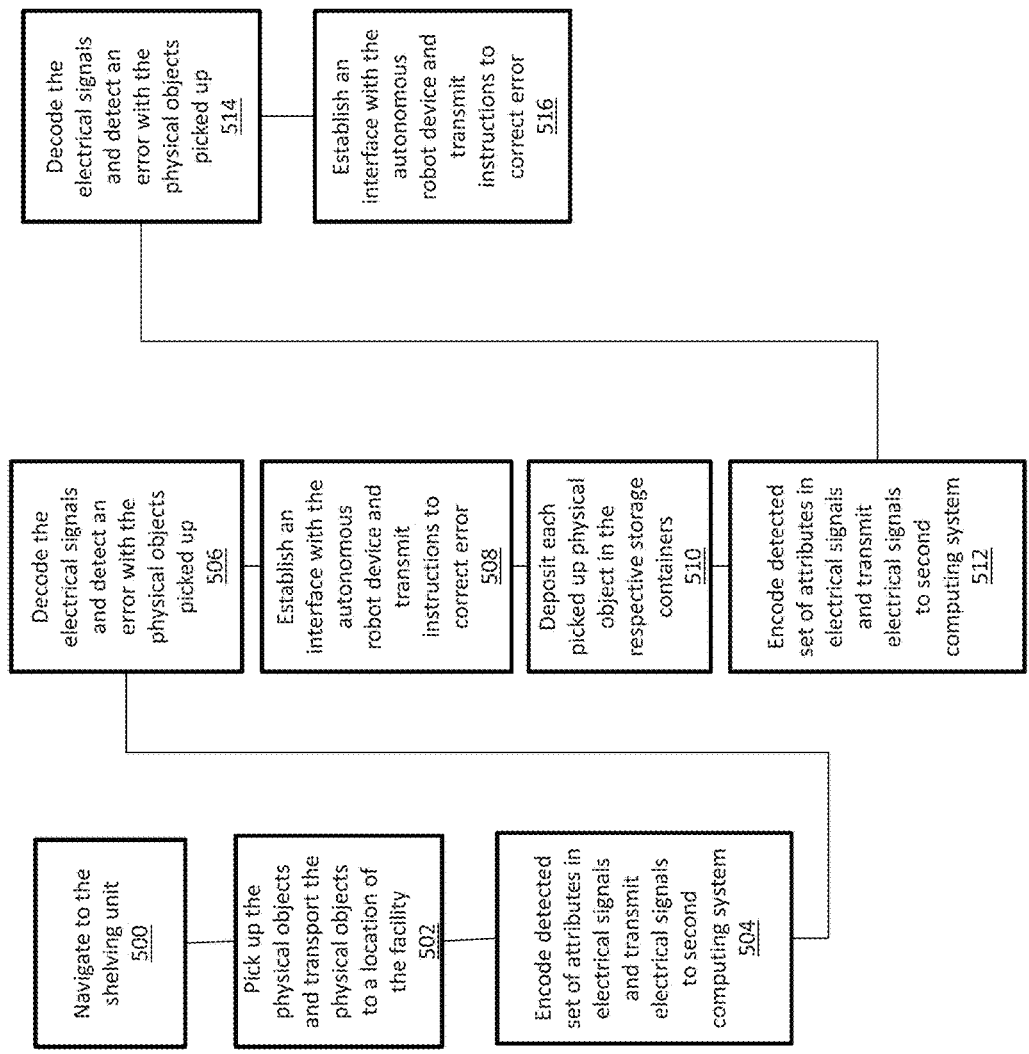
FIG. 5 is a flowchart illustrating the process of the autonomous robotic interfacing system according to exemplary embodiment.

FIG. 5 is a flowchart illustrating an example process of the embodiments of the autonomous robotic interfacing system according to the present disclosure. In operation 500, in response to instructions from a second computing system (e.g., second computing system 202 as shown in FIG. 2), an autonomous robot device (e.g., autonomous robotic devices 120, 150 and 260 as shown in FIGS. 1A-B, D and 2) can navigate to the shelving unit (e.g., shelving unit 102 as shown in FIG. 1A) in which physical objects (e.g., physical objects 104-110, 152, 156, 162, 182a-e as shown in FIGS. 1A-B and D) are disposed, to pick up a first quantity of physical objects.

In operation 502, the autonomous robot device can pick up the physical objects and transport the physical objects to a location of the facility including storage containers. Sensors (e.g., sensors 142 176 and 245 as shown in FIGS. 1A 1C and 2) can be disposed at the shelving unit in which the physical objects are disposed. The sensors can detect a change in weight, temperature or moisture in response to the physical objects being picked up by the autonomous robot device. In operation 504, in response to the physical objects being picked up, the sensors can encode a detected set of attributes in signals and transmit the signals to the second computing system. The second computing system can execute a routing engine (e.g., routing engine 222 as shown in FIG. 2) in response to receiving the signals. In operation 506, routing engine can decode the signals and detect an error with the physical objects picked up by the autonomous robot device based on the set of attributes decoded from the signals. In operation 508, the routing engine can establish an interface with the autonomous robot device. The routing engine can instruct the autonomous robot device through the interface to correct the correct the error with the physical objects that were picked up by the autonomous robot device.

In operation 510, the autonomous robot device can deposit each picked up physical object in the respective storage containers. Sensors (e.g. sensors 158 160 176 and 245 as shown in FIGS. 1B-1C and 2) can be disposed in the storage containers. The sensors can detect a change in weight, temperature and/or moisture in response to the autonomous robot device depositing the physical objects in the storage containers. In operation 512, in response to the physical objects being deposited, the sensors can encode a detected set of attributes into electrical signals and transmit the electrical signals to the second computing system. The second computing system can execute the routing engine in response to receiving the electrical signals. In operation 514, routing engine can decode the electrical signals and detect an error with the physical objects deposited in the storage containers by the autonomous robot device based on the set of attributes decoded from the electrical signals. In operation 516, the routing engine can establish an interface with the autonomous robot device. The routing engine can instruct the autonomous robot device through the interface to correct the correct the error with the physical objects that were deposited by the autonomous robot device.

Figure 6:
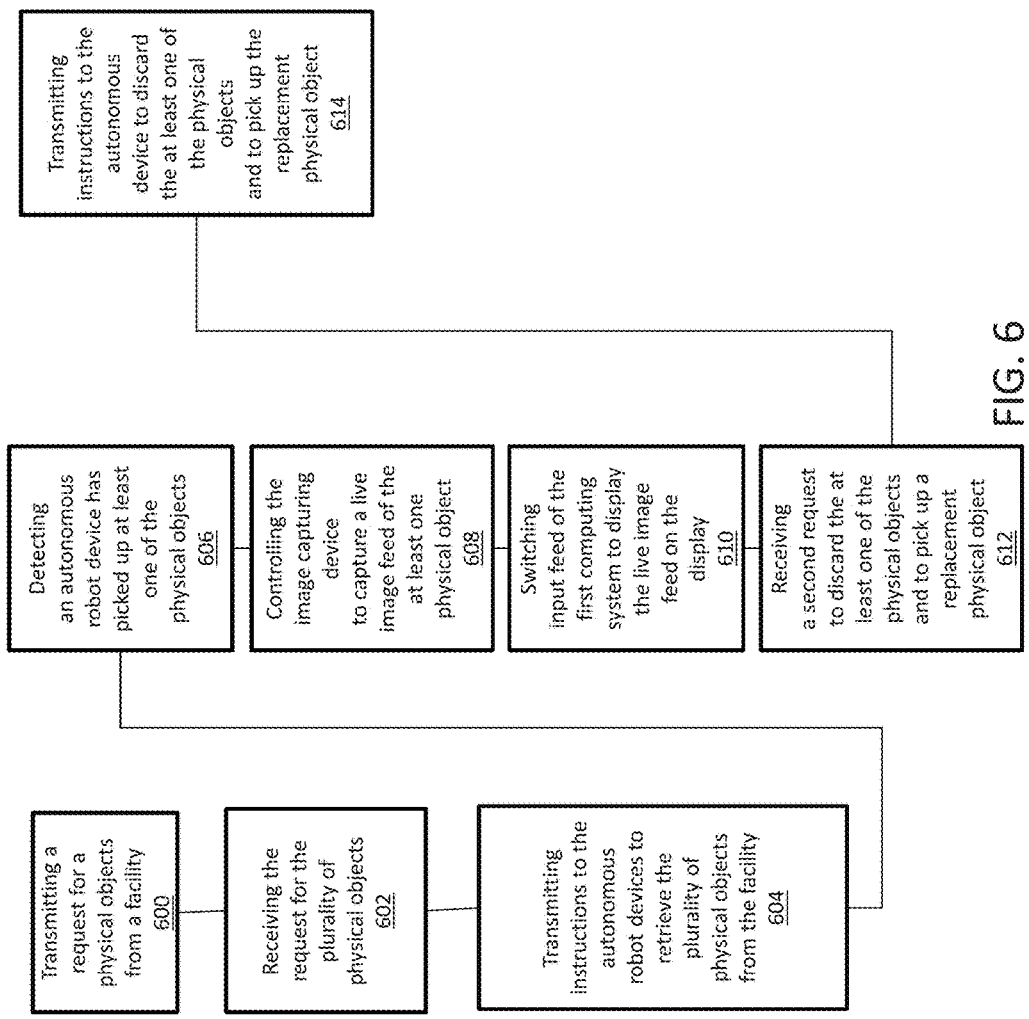
FIG. 6 is a flowchart illustrating the process of an autonomous robotic fulfillment system configured to interface with a computing system using a live image feed according to exemplary embodiment.

FIG. 6 is a flowchart illustrating an example process of embodiments of the automatic robotic fulfillment system configured to interface with a computing system using a live image feed according to the present disclosure. In operation 600, the first computing system (e.g., first computing system 186, 200 as show in FIGS. 1D and 2) can transmit a request for physical objects (e.g., physical objects 104-110, 152, 156, 162, 182a-e as shown in FIGS. 1A-B, D) from a facility. The first computing system can include an interactive display (e.g., interactive display 188, 220 as shown in FIGS. 1D and 2). In operation 602, a second computing system (e.g., second computing system 202 as shown in FIG. 2) can receive the request for the plurality of physical objects from the first computing system. In operation 604, the second computing system can transmit instructions to autonomous robot devices (e.g., autonomous robotic devices 120, 150, 191 and 260 as shown in FIGS. 1A-B, D and 2) to retrieve the physical objects from the facility.

In operation 606, the second computing system can detect the autonomous robot device has picked up at least one of the physical objects. In operation 608, the second computing system can control the image capturing device (e.g., image capturing device 122, 190 as shown in FIGS. 1A and D) of the autonomous robot device to capture a live image feed of the at least one physical object picked up by the autonomous robot device. In operation 610, the second computing system can switch an input feed of the first computing system to display the live image feed on the display of the first computing system. In operation 612, the second computing system can receive a second request from first computing system to discard the at least one of the physical objects picked up by the autonomous robot device and to pick up a replacement physical object. In operation 614 the second computing system, can transmit instructions to the autonomous device to discard the at least one of the physical objects picked up by the autonomous robot device and to pick up the replacement physical object.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. An autonomous system including autonomous robot devices, the system comprising:

a first computing system including an interactive display configured to transmit a first request for a plurality of physical objects from a facility;

a plurality of autonomous robot devices including a controller, a drive motor, an articulated arm, a reader, an inertial navigation system and an image capturing device, the plurality of autonomous robot devices configured to navigate autonomously through the facility;

a database in communication with the plurality of robots, configured to store information associated with the plurality of physical objects;

a second computing system in communication with the first computing system, the database, and the plurality of autonomous robot devices, the second computing system configured to:

receive the first request for the plurality of physical objects from the first computing system;

transmit instructions the at least one of the plurality of autonomous robot devices to retrieve the plurality of physical objects from the facility;

detect the at least one autonomous robot device has picked up at least one of the plurality of physical objects;

control the image capturing device of the at least autonomous robot device to capture a live image feed of the at least one physical object picked up by the at least autonomous robot device;

switch an input feed of the first computing system to display the live image feed on the display of the first computing system;

receive a second request from first computing system to discard the at least one of the physical objects picked up by the at least one autonomous robot device and to pick up a replacement physical object; and transmit instructions to the at least one autonomous device to discard the at least one of the physical objects picked up by the at least one autonomous robot device and to pick up the replacement physical object, the instructions include one or more identifiers for the plurality of physical objects.

2. The system of claim 1, wherein the at least one of the autonomous robot further devices configured to:

query the database using the one or more identifiers for the plurality of physical objects to retrieve the locations at which the plurality of physical objects are disposed;

navigate autonomously through the facility to the locations in response to operation of the drive motor by the controller;

locate and scan one or more machine readable elements encoded with the one or more identifiers;

detect, via at least one image captured by the image capture device, that the plurality of physical objects are disposed at the locations;

pick up a first quantity of each of the plurality of physical objects using the articulated arm.

3. The system in claim 2, wherein the at least one of the autonomous robot further devices configured to:

carry and navigate with the first quantity of each of the plurality of physical objects to a specified location.

4. The system in claim 3, further comprising a plurality of sensors disposed at the locations of each of the plurality of physical objects, the plurality of sensors configured to determine a set of attributes associated with each of the plurality of physical objects retrieved by the at least one autonomous robot device.

5. The system in claim 4, wherein the second computing system is further configured to transmit an alert to be displayed on the display of the first computing system based on the detected set of attributes for the at least one of the plurality of physical objects retrieved by the at least one autonomous robot device.

6. The system in claim 3, wherein the first computing system is disposed in the facility and the specified location is a location of the first computing system within the facility.

7. The system in claim 6, wherein the at least one autonomous robot device is further configured to navigate to a storage container within the facility, deposit the first quantity of each of the plurality of physical object in the storage container, pick up the storage container and carry and navigate the storage container to the specified location.

8. The system in claim 7, wherein the specified location is a parking lot in which a plurality of automobiles are disposed.

9. The system in claim 8, wherein the first request received by the second computing system includes an identification number associated with at least one of the plurality of automobile and a tag number associated with the at least one automobile.

10. The system in claim 8, wherein the at least one autonomous robotic device is further configured to:
carry the storage container to the parking lot;
detect using the image capturing device, the identification number of the at least one automobile;
navigate to the at least one automobile;
autonomously open an access point of the at least one automobile using the tag number; and
deposit the storage container inside the at least one automobile, via the access point.

11. An autonomous method including autonomous robot devices, the method comprising:
transmitting, via a first computing system including an interactive display, a first request for a plurality of physical objects from a facility;
navigating, via a plurality of autonomous robot devices including a controller, a drive motor, an articulated arm, a reader, an inertial navigation system and an image capturing device, autonomously through the facility;
receiving, via a second computing system in communication with the first computing system and the plurality of autonomous robot devices, the first request for the plurality of physical objects from the first computing system;
transmitting, via the second computing system, instructions the at least one of the plurality of autonomous robot devices to retrieve the plurality of physical objects from the facility;
detecting, via the second computing system, the at least one autonomous robot device has picked up at least one of the plurality of physical objects;
controlling, via the second computing system, the image capturing device of the at least autonomous robot device to capture a live image feed of the at least one physical object picked up by the at least autonomous robot device;
switching, via the second computing system, an input feed of the first computing system to display the live image feed on the display of the first computing system;
receiving, via the second computing system, a second request from first computing system to discard the at least one of the physical objects picked up by the at least one autonomous robot device and to pick up a replacement physical object;
transmitting, via the second computing system, instructions to the at least one autonomous device to discard the at least one of the physical objects picked up by the at least one autonomous robot device and to pick up the replacement physical object, the instructions from the second computing system include one or more identifiers for the plurality of physical objects.

12. The method of claim 11, further comprising:
querying, via the at least one of the autonomous robot devices, a database operatively coupled to the second computing system and the plurality of the autonomous robot devices using the one or more identifiers for the plurality of physical objects;
navigating, via the at least one autonomous robot device, autonomously through the facility to the first set of object locations in response to operation of the drive motor by the controller;
locating and scanning, via the at least one autonomous robot device, one or more machine readable elements encoded with the one or more identifiers;
detecting, via at least one image captured by the image capture device of the at least one autonomous robot device, that the first group of physical objects are disposed at the first set of locations; and
picking up, via the at least one autonomous robot device, a first quantity of physical objects in the first group using the articulated arm.

13. The method in claim 12, further comprising:
carrying and navigating, via the at least one autonomous robot device, with the first quantity of the first quantity of physical objects in the first group to the storage containers located at a specified location.

14. The method in claim 13, further comprising determining, via a plurality of sensors disposed at the locations of each of the plurality of physical objects, a set of attributes associated with each of the plurality of physical objects retrieved by the at least one autonomous robot device.

15. The method in claim 14, further comprising transmitting, via the second computing system, an alert to be displayed on the display of the first computing system based on the detected set of attributes for the at least one of the plurality of physical objects retrieved by the at least one autonomous robot device.

16. The method in claim 13, wherein the first computing system is disposed in the facility and the specified location is a location of the first computing system within the facility.

17. The method in claim 16, further comprising navigating, via the at least autonomous robot device, to a storage container within the facility, deposit the first quantity of each of the plurality of physical object in the storage container, pick up the storage container and carry and navigate the storage container to the specified location.

18. The method in claim 17, wherein the specified location is a parking lot in which a plurality of automobiles are disposed.

19. The method in claim 18, wherein the first request received by the second computing system includes an identification number associated with at least one of the plurality of automobile and a tag number associated with the at least one automobile.

20. The method in claim 19, further comprising:
carrying, via the at least one autonomous robotic device, the storage container to the parking lot;
detecting, via the at least one autonomous robotic device, using the image capturing device, the identification number of the at least one automobile;
navigating, via the at least one autonomous robotic device, to the at least one automobile;

autonomously opening, via the at least one autonomous robotic device, an access point of the at least one automobile using the tag number; and depositing, via the at least one autonomous robotic device, the storage container inside the at least one automobile, via the access point.

21. An autonomous system including autonomous robot devices, the system comprising:

a first computing system including an interactive display configured to transmit a first request for a plurality of physical objects from a facility;

a plurality of autonomous robot devices including a controller, a drive motor, an articulated arm, a reader, an inertial navigation system and an image capturing device, the plurality of autonomous robot devices configured to navigate autonomously through the facility;

a database in communication with the plurality of robots, configured to store information associated with the plurality of physical objects;

a second computing system in communication with the first computing system, the database, and the plurality of autonomous robot devices, the second computing system configured to:

receive the first request for the plurality of physical objects from the first computing system;

transmit instructions the at least one of the plurality of autonomous robot devices to retrieve the plurality of physical objects from the facility;

detect the at least one autonomous robot device has picked up at least one of the plurality of physical objects;

control the image capturing device of the at least autonomous robot device to capture a live image feed of the at least one physical object picked up by the at least autonomous robot device;

switch an input feed of the first computing system to display the live image feed on the display of the first computing system;

receive a second request from first computing system to discard the at least one of the physical objects picked up by the at least one autonomous robot device and to pick up a replacement physical object; and transmit instructions to the at least one autonomous device to discard the at least one of the physical objects picked up by the at least one autonomous robot device and to pick up the replacement physical object, the instructions include one or more identifiers for the plurality of physical objects; and a plurality of sensors disposed at the locations of each of the plurality of physical objects, configured to:

determine a set of attributes associated with each of the plurality of physical objects retrieved by the at least one autonomous robot device;

wherein the second computing system is further configured to transmit an alert to be displayed on the display of the first computing system based on the detected set of attributes for the at least one of the plurality of physical objects retrieved by the at least one autonomous robot device.

* * * * *